United States Patent [19]

Chapman et al.

[11] Patent Number: 4,650,320

[45] Date of Patent: Mar. 17, 1987

[54] DETECTING LUMINESCENT SECURITY FEATURES

[75] Inventors: Victor B. Chapman; Michael Potter, both of Hants, England

[73] Assignee: De La Rue Systems Limited, London, England

[21] Appl. No.: 604,962

[22] Filed: Apr. 27, 1984

[30] Foreign Application Priority Data

Apr. 29, 1983 [GB] United Kingdom ................. 8311795

[51] Int. Cl.[4] ................................................ G06K 7/10

[52] U.S. Cl. .................................... 356/71; 250/458.1

[58] Field of Search .......................... 356/71, 448, 433; 250/458.1, 459.1, 338 R, 341, 461.1, 252.1, 271, 372; 209/556, 534

[56] References Cited

U.S. PATENT DOCUMENTS

| | | | |
|---|---|---|---|
| 3,977,792 | 8/1976 | Jumonji et al. | 250/202 |
| 4,097,731 | 6/1978 | Krause et al. | 250/214 AG X |
| 4,105,333 | 8/1978 | Kaule et al. | 356/71 X |
| 4,146,792 | 3/1979 | Stenzel et al. | 250/461.1 X |
| 4,219,277 | 8/1980 | Yarsshuk et al. | 356/431 |
| 4,275,299 | 6/1981 | Favre | 250/252.1 X |
| 4,296,326 | 10/1981 | Haslop et al. | 356/71 X |
| 4,319,137 | 3/1982 | Nakamura et al. | 250/556 |
| 4,442,170 | 4/1984 | Kaule et al. | 356/71 X |
| 4,451,521 | 5/1984 | Kaule et al. | 250/458.1 X |
| 4,452,843 | 6/1984 | Kaule et al. | 356/71 X |
| 4,524,276 | 6/1985 | Ohtombe | 356/71 X |
| 4,529,881 | 7/1985 | Ceurvels et al. | 250/372 X |

FOREIGN PATENT DOCUMENTS 1326665 8/1973 United Kingdom .

*Primary Examiner*—R. A. Rosenberger

*Attorney, Agent, or Firm*—Cushman, Darby & Cushman

[57] ABSTRACT

Luminescent security features in or on documents are detected using a detector comprising a fibre optic light guide arranged to transmit an interrogation beam originating from a source onto a document to be tested; and a housing in which a photo-diode array is mounted to receive luminescence emitted from the document. The photo-diode array is connected to electronic circuitry for discriminating between luminescence due to a security feature and other luminescence emitted by the document and for determining that a security feature has been detected.

16 Claims, 8 Drawing Figures

DETECTING LUMINESCENT SECURITY FEATURES

The invention relates to a method and apparatus for detecting luminescent security features in or on documents.

It has been proposed in the past to irradiate security documents, particularly paper sheets such as bank notes, with ultra-violet radiation to determine whether or not the document is luminescent. The generation of a bluish luminescence can be indicative of a forged document. Recently, luminescent materials have been incorporated into, or printed on, documents to provide security features in themselves. One form of security feature is a luminescent thread. Previous methods for detecting such security features involve using accurate and complex filtering techniques to detect whether luminescence emitted by the document falls within a particular wavelength band. These methods do not enable security features which luminesce at substantially the same wavelength as other features to be discriminated.

In accordance with one aspect of the present invention, a method of detecting luminescent security features in or on documents comprises illuminating a test document with an interrogation beam; sensing luminescence emitted from the document with sensing means; dividing the area over which luminescence is sensed into a plurality of portions; comparing the intensity of the luminescence of each portion with the average intensity of all the portions; and detecting the presence of a security feature if the two intensities satisfy a predetermined relationship.

We also provide in accordance with a second aspect of the present invention a detector for detecting luminescent security features in or on documents, the detector comprising means for illuminating a test document with an interrogation beam; sensing means for sensing luminescence emitted from the document; and discriminating means for discriminating between luminescence due to a security feature and other luminescence emitted by the document, the discriminating means comprising means for comparing the average intensity of the luminescence emitted over a plurality of adjacent portions of the document with the intensity of each portion and detecting means for detecting whether the compared intensities satisfy a predetermined relationship.

With this method and apparatus, we are able to detect luminescent security features even where the luminescence of the security feature has substantially the same wavelength as other parts of the documents.

The relationship between the two intensities may be for example a minimum ratio which must be achieved or possibly the two intensities could be subtracted one from the other and the presence of the security feature detected if the difference exceeds a predetermined threshold.

In one example, the method may further comprise repeating the sensing step over a plurality of areas of the document, and detecting the presence of a composite security feature if a predetermined arrangement of individual security features are detected. Such a method is particularly suitable for detecting a luminescent security thread, the method comprising feeding a test document past the sensing means in a direction such that a security thread will extend in the feed direction; sensing luminescence emitted from a plurality of sets of adjacent portions of the test document, each set of adjacent portions being aligned transversely to the security thread; determining which portion or portions of each set of portions has emitted luminescence corresponding to a security feature; and detecting the presence of a security thread if security features are detected for each set of portions in positions which are arranged in a manner corresponding to a security thread. Such an arrangement could be a straight line.

Preferably, the document containing the security thread passes the sensing means with the thread extending parallel to the direction of motion.

If a minimum number of individual security features, representing successive portions of the security thread, are detected then a composite security feature comprising the whole thread is detected.

Conveniently, the method further comprises periodically checking for failure of the sensing means and this may be carried out between successive documents. This enables the method to be substantially automated since the checking step will reveal any failure in the sensing means and such failure can be indicated by means of a suitable alarm.

The checking step may be carried out by checking means which preferably comprises means for ensuring that no luminescence is sensed when no document is being illuminated; and means for illuminating the sensing means and means to check that the sensing means then senses the apparent presence of luminescence.

In one example, the checking means includes circuitry for ensuring that the output from the sensing means does not exceed a low level threshold when no document is present. The means for illuminating the sensing means may be a light emitting diode (LED).

It is possible that a forger might try to duplicate a luminescent security feature normally incorporated into the document by providing a similar feature on a surface of the document. In order to detect such a forgery, the apparatus preferably further comprises another sensing means positioned on the opposite side of the document to the one sensing means to detect luminescence emitted from that side of the document.

With this arrangement, if the forged feature is on the side of the document which is illuminated it will strongly luminesce on that side while relatively weak luminescence will be detected on the other side of the document. In contrast, a genuine security feature within the document will strongly luminesce on both sides of the document.

Preferably, the or each sensing means comprises a photo-diode array. This is particularly suitable for dividing the area over which luminescence is sensed into a plurality of portions. Conveniently, where the detector is arranged to detect a security thread, the or each sensing means comprises a line of sensors, the line being transverse, in use, to the security thread.

One important advantage of the detector according to the second aspect of the invention is that it may be used in apparatus for automatically detecting the presence of security features on a plurality of documents. In this case, means are provided for automatically feeding successive ones of the documents past the illuminating means and the sensing means; together with means for indicating a document in which a security feature has not been detected.

The detector is capable of detecting security features very rapidly and this enables high speed operation to be undertaken (e.g. 20 bank notes/sec).

In one convenient form, the detector includes checking means as outlined above and further comprises means for indicating the presence of a fault in the or each sensing means. This is particularly useful for fully automated operation since the indicating means can for example generate a fault signal for terminating operation and/or initiating an alarm. Conveniently, the checking means is operable between successive documents so that after each document is processed a check is carried out.

The form of the interrogation beam depends on the nature of the luminescent security feature but is typically white light causing the luminescent security feature to luminesce in the infra-red. With a suitable choice of filters and light source, security features luminescing in other regions of the spectrum may be detected, when illuminating with other than visible light. Furthermore, by arranging to sense luminescence a predetermined time interval after the document has been illuminated by the interrogation beam, or by suitably modulating the interrogation beam and including de-modulating circuitry in the processing circuitry, it is possible to differentiate between fluorescence and phosphorescence.

Two examples of methods and detectors in accordance with the present invention will now be described with reference to the accompanying drawings, in which.

Figure 1B:
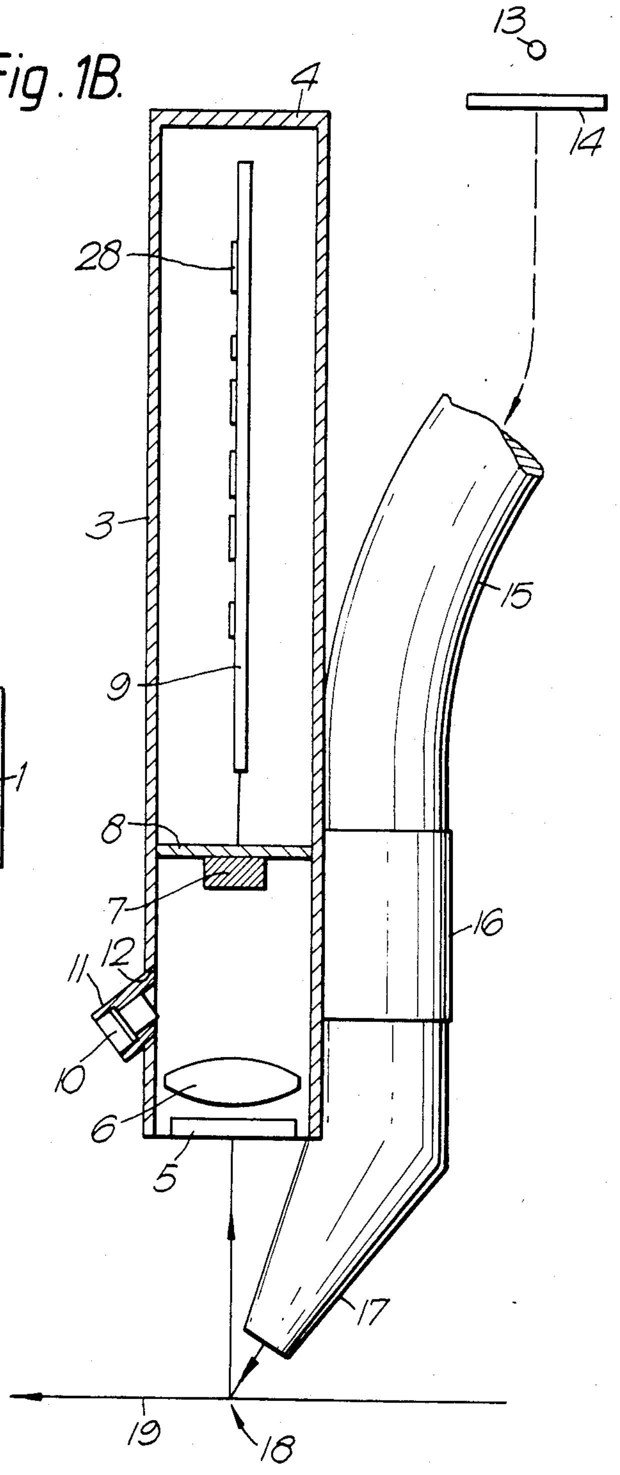
FIG. 1B is a diagrammatic view of a detector.
Figure 1A:
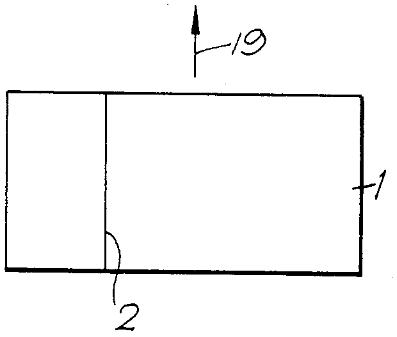
FIG. 1A is a plan of a document incorporating a security thread.

A bank note 1 having a rectangular shape is illustrated in FIG. 1A. A luminescent security thread 2 extends across the width of the bank note 1. In this case, the security thread 2 is incorporated within the paper of the bank note.

Figure 2:
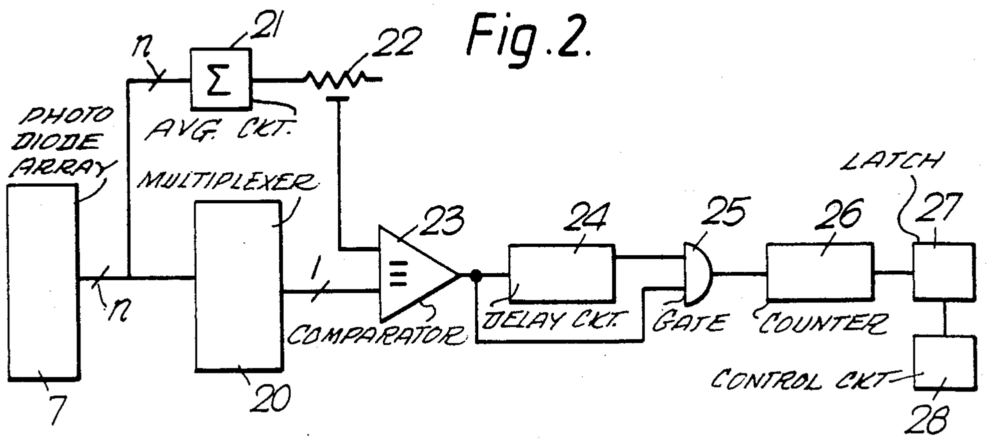
FIG. 2 illustrates circuitry for use with the detector of FIG. 1B.

A detector for detecting the security thread 2 is illustrated in FIG. 1B. The detector may be incorporated in automatic bank note sorting apparatus (not shown). The detector comprises a housing 3 of circular cross-section one end 4 of which is closed while a filter 5 is mounted at the other end. The filter 5 transmits, in this case, infra-red luminescence but will be chosen in general to match the characteristics of the security features to be detected in order to filter out unwanted wavelengths. A lens 6 is mounted in the housing 3 adjacent the filter 5 and is arranged to focus luminescence passing through the filter 5 onto a photo-diode array 7. The photo-diode array 7 is mounted on a support 8 secured within the housing 3. The photo-diode array 7 is electrically connected to circuitry on a printed circuit board 9 also mounted (by means not shown) in the housing 3. The circuitry is illustrated in FIG. 2.

A light emitting diode (LED) 10 is mounted in an outwardly extending support 11 fixed in an aperture 12 in the housing 3. The LED 10 is arranged to direct light onto the photo-diode array 7 when it is illuminated. The detector also includes a tungsten halogen light source 13 mounted to another housing part (not shown) which is arranged to transmit visible, white light through an infra-red absorbing filter 14 into a fibre optic light guide 15. The fibre optic light guide 15 is mounted to the housing 3 by a suitable clamp 16. The fibre optic light guide 15 terminates in a fishtail portion 17 which directs light onto an area 18.

In use, documents 1 are fed in succession by a conventional means such as conveyor belts (not shown) under the housing 3 and the light guide 15 in the direction of the arrow 19. The documents 1 are fed so that the security thread 2 is parallel with the direction of motion. The photo-diode array 7 comprises a single line of photo-diodes arranged transversely to the direction of movement of the document. Light from the light source 13 is first filtered to remove infra-red wavelengths by the filter 14 and is then directed via the fibre optic fishtail 17 onto the document 1. A strip of the illuminated surface of the document 1 is then imaged onto the photo-diode array 7 by the lens 6 and the infra-red transmitting filter 5 removes all visible wavelengths from the light beam and thus prevents any reflected light from reaching the array 7. Thus, no light reaches the photo-diode array 7 unless a luminescent feature on or in the document is stimulated by the incident visible light to emit infra-red radiation. In practice, a small amount of light of the unwanted wavelengths may be transmitted by the filters 5, 14, so that a small signal may be generated by the elements of the array 7 but this can be dealt with by the circuitry to be described.

The width of document to be interrogated is chosen as appropriate depending on the expected position of the security thread 2. The document 1 is scanned as it passes beneath the lower end of the housing 3 and a typical interval between scans is 1 mm. This may be adjusted to suit specific documents.

The image of the security thread 2, when focused onto the photo-diode array 7, will cause one (or an adjacent pair) of the photo-diode outputs to be significantly different from all the others. It is this property which is looked for when the signals are processed.

The signal processing circuitry is illustrated in FIG. 2. In order to reduce the complexity of the processing electronics, the outputs of the diode array 7 are sequentially multiplexed by a multiplexer 20 into a single analogue datastream. The outputs from the photo-diode array 7 are also fed to a circuit 21 for obtaining the means output and from there to a variable resistance 22 which feeds a preset fraction of the mean output to a comparator 23. The single analogue datastream output from the multiplexer 20 is also fed to the comparator 23 so that a comparison is made between each photo-diode output and the mean of the entire array. The result of this comparison, now a digital signal, is auto-correlated. Auto-correlation is achieved by taking the digital signal from the comparator 23 and feeding this to a delay circuit 24 and to an AND gate 25. The output of the delay circuit 24 is then fed to the AND gate 25 where it is ANDed with the undelayed signal to produce the desired auto-correlation. The auto-correlated signal from the AND gate 25 is then counted by a counter 26 and if the counter output exceeds a preset value, the security thread 2 is deemed to be detected and a latch 27 is set.

If a scan is carried out at 1 mm intervals as indicated previously, the counter 26 will be set to count a sufficient number of scans for all or a large portion of the security thread to be scanned.

Control electronics 28 of conventional form (such as a microprocessor) is also provided on the PCB 9 to carry out two checks on the diodes of the photo-diode array 7. Firstly, the control electronics looks momentarily at the outputs of the photo-diodes in the array 7 between the passage of successive documents 1 (when light from the source 13 will not be reflected through the filter 5) to ensure that the output signal of each diode is below a low level threshold setting. Secondly, the LED 10 is momentarily activated between the passage of successive documents and the control electronics 28 checks the outputs of each diode of the photo-diode array 7 to ensure that each has an output that exceeds a high level threshold. If a fault is detected during the tests the control electronics 28 provides a suitable output signal.

Figure 3A:
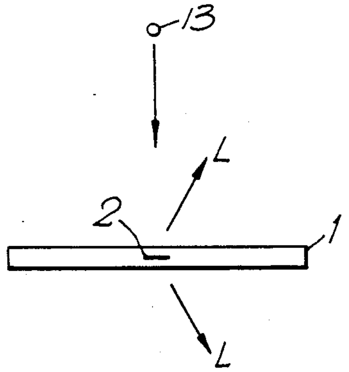
FIGS. 3A, 3B, 3C are diagrammatic cross-sections through bank notes illustrating how forged and genuine security features are distinguished.
Figure 3B:
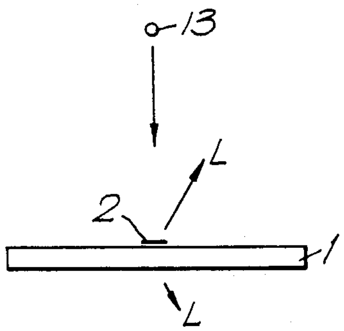
Figure 3C:
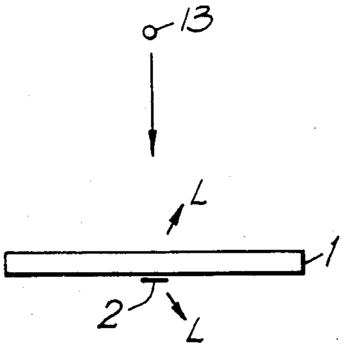

FIG. 3A illustrates a document 1 having a security thread 2 incorporated within the document. When such a document 1 passes beneath the detector illustrated in FIG. 1B, strong luminescence (L) is emitted on both sides of the document 1, as indicated by the long arrows in FIG. 3A. If, however, a document having a luminescent security thread or luminescent ink on its surface passes beneath the detector of FIG. 1B, the intensity of luminescence (L) emitted on each side of the document will differ. FIG. 3B illustrates the case where a security thread 2 is provided on the surface which is illuminated and in this case strong luminescence occurs from that surface but only a weak luminescence (L) indicated by the relatively short arrow will be detected from the other surface. Conversely, FIG. 3C illustrates the same document 1 of FIG. 3B but after having been reversed when only weak luminescence (L) will occur from both sides of the document 1.

Figure 4:
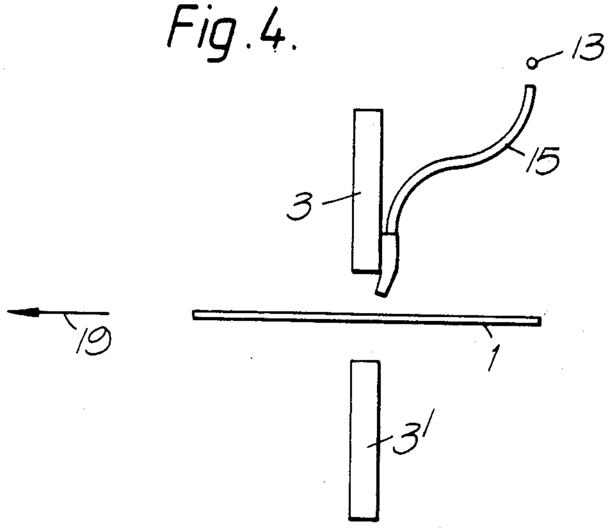
FIG. 4 is a diagrammatic illustration of apparatus for use in detecting the forged documents shown in FIGS. 3B and 3C; and, FIG. 5 illustrates additional circuitry for use when detecting phosphorescent security features.

FIG. 4 illustrates diagramatically another example of a detector in this case for discriminating between a document 1 having an internal security thread 2 as shown in FIG. 3A and a document having a security thread 2 on its surface. The apparatus of FIG. 4 is essentially the same as that shown in FIG. 1B but with the addition of a second housing 3' having exactly the same components as the housing 3 but positioned on the opposite side of the document 1 to the housing 3. Additional illumination means are not, however, provided. The photo-diode array (not shown) supported by the housing 3' will detect luminescence emitted from the adjacent side of the document 1 and by comparing the intensities of luminescence detected by each photo-diode array using suitable electronic circuitry (not shown) the authenticity of the security thread 2 can be determined. In other words, a document will only be classified as genuine if luminescence of sufficient strength is sensed by both photo-diode arrays.

Figure 5:
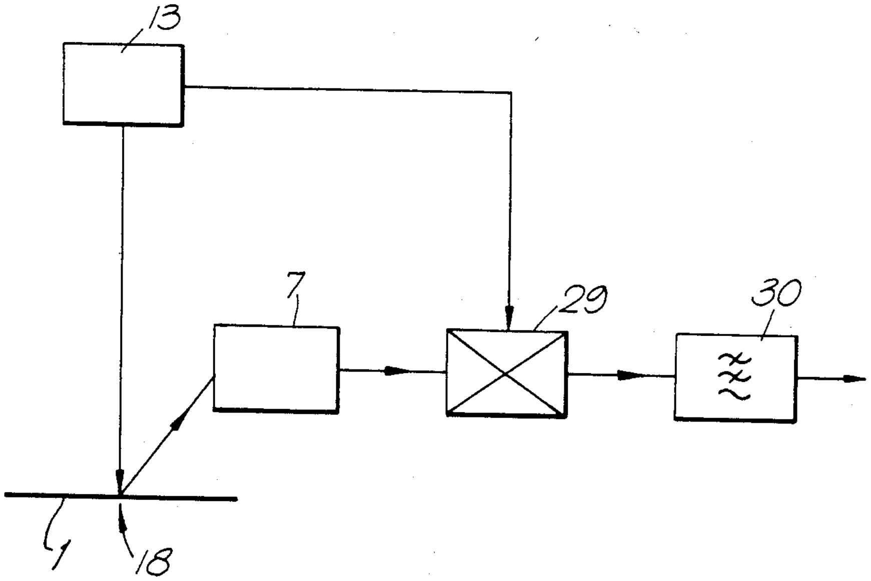

The output from the latch 27 is fed to the control electronics 28 which provides an output indicating the presence or absence of a security feature in or on the document.

Where it is desired to discriminate between phosphorescent and fluorescent features, the apparatus of FIG. 1B may be used but with the modified circuitry shown in FIG. 5. In this case, the interrogation beam supplied by the source 13 is modulated at a frequency F and the output from the photo-diode array 7 is fed to a phase sensitive detector 29 to which is also supplied the frequency F. The output from the phase sensitive detector 29 is fed via a low pass filter 30 to the multiplexer 20 and the circuit 21 shown in FIG. 2. Since the interrogation beam supplied by the source 13 is not continuous it is possible to distinguish between fluorescent and phosphorescent features using the circuitry shown in FIG. 5.

In an alternative arrangement (not shown) the area 18 which is illuminated may be positioned upstream from the position shown in FIG. 1B so that luminescence is received by the diode array 7 a predetermined time interval after the test document has been illuminated with the interrogation beam so that fluorescent and phosphorescent features may be differentiated.

We claim:

1. A method of detecting a luminescent security thread in or on a document, the method comprising: feeding a test document in a feed direction past sensing means such that said security thread will extend in said feed direction; generating an interrogation beam; illuminating said test document with said interrogation beam; filtering out substantially all wavelengths in said interrogation beam from radiation reflected from or transmitted through said document to separate out luminescence emitted from the document, sensing with said sensing means luminescence emitted from a plurality of sets of adjacent portions of said test documents, each said set of adjacent portions being aligned transversely to said security thread and determining the intensity of said sensed luminescence; for each set of portions comparing the intensity of said luminescence of each said portion with the average intensity of all said portions in said set; detecting the presence of a security feature if said two intensities satisfy a predetermined relationship; determining which portion or portions of each said set of portions has emitted luminescence corresponding to a security feature; and detecting the presence of said security thread if said security features are detected for each said set of portions in positions which are arranged in a manner corresponding to said security thread.

2. a method according to claim 1, further comprising periodically checking for failure of said sensing means.

3. A method according to claim 2, wherein said checking step is carried out between successive ones of said documents.

4. A method according to claim 1, wherein luminescence emitted from both sides of said document is sensed.

5. A method according to claim 1, wherein said interrogation beam is modulated, and said sensed luminescence is first demodulated prior to said comparing step so that fluorescent and phosphorescent features may be differentiated.

6. A method according to claim 1, wherein said sensing means senses luminescence emitted from said document a predetermined time interval after said document has been illuminated with said interrogation beam so that fluorescent and phosphorescent features may be differentiated.

7. A method according to claim 1, wherein the difference between said two intensities is detemined, said predetermined relationship comprising a minimum predetermined threshold which must be exceeded by said difference between said two intensities.

8. A detector for detecting a luminescent security thread in or on a document, said detector comprising: means for feeding said document in a feed direction with said security thread extending in said feed direction; illuminating means for illuminating a test document with an interrogation beam; first sensing means comprising a line of sensors transverse to said security thread for sensing luminescence emitted from sets of adjacent portions of said document; a filter positioned such that radiation from said document passes through said document before impinging on said sensing means, said filter being adapted to filter out substantially all wavelengths present in said interrogation beam; discriminating means for discriminating between luminescence due to security thread and other luminescence emitted by said document, said discriminating means comprising comparison means for comparing the average intensity of luminescence emitted by each set of adjacent portions of said document with the intensity of each portion; and detecting means for detecting a security feature by detecting whether said compared intensities satisfy a predetermined relationship, and for detecting the presence of said security thread if said security features are detected for each said set of portions in positions which are arranged in a manner corresponding to said security thread.

9. A detector according to claim 8, further comprising checking means for checking for failure of said first sensing means.

10. A detector according to claim 9, wherein said checking means comprises means for ensuring that no luminescence is sensed when no document is being illuminated; and means for illuminating said first sensing means and means to check that said sensing means then senses the apparent presence of luminescence.

11. A detector according to claim 8, further comprising second sensing means positioned on the opposite side of said document to said first sensing means to detect luminescence emitted from that side of said document.

12. A detector according to claim 11, wherein said second sensing means comprises a photo-diode array.

13. A detector according to claim 11, for detecting a luminescent security thread, wherein said second sensing means comprises a line of sensors, said line being adapted to be transverse to said security thread.

14. Apparatus according to claim 13, further comprising checking means for indicating the presence of a fault in said first sensing means.

15. Apparatus according to claim 13, wherein said checking means is operable between successive ones of said documents.

16. A detector according to claim 8, wherein said first sensing means comprises a photo-diode array.

* * * * *